US012634630B2

(12) United States Patent
Fuller et al.

(10) Patent No.: US 12,634,630 B2
(45) Date of Patent: May 19, 2026

(54) MOTOR ASSEMBLY FOR SPEAKER DEVICE

(71) Applicant: Systematic Audio, LLC, Knoxville, TN (US)

(72) Inventors: Jacob Aaron Fuller, Newton, NC (US); Murilo Kulczynski Alvares, Brossard (CA)

(73) Assignee: Systematic Audio, LLC, Knoxville, TN (US)

(*) Notice: Subject to any disclaimer, the term of this patent is extended or adjusted under 35 U.S.C. 154(b) by 158 days.

(21) Appl. No.: 18/448,646

(22) Filed: Aug. 11, 2023

(65) Prior Publication Data

US 2025/0056160 A1 Feb. 13, 2025

(51) Int. Cl.
*H04R 7/08* (2006.01)

(52) U.S. Cl.
CPC .................................... *H04R 7/08* (2013.01)

(58) Field of Classification Search
CPC ............ H04R 7/08; H04R 9/06; H04R 9/025
See application file for complete search history.

(56) References Cited

U.S. PATENT DOCUMENTS

| | | | |
|---|---|---|---|
| 1,073,568 A | 9/1913 | Conklin | |
| 5,321,762 A | 6/1994 | Stuart | |
| 5,408,533 A | 4/1995 | Reiffin | |
| 5,452,366 A | 9/1995 | Sakamoto et al. | |
| 5,539,262 A | 7/1996 | Strugach | |
| 5,598,625 A | 2/1997 | Bluen et al. | |
| 5,715,324 A | 2/1998 | Tanabe et al. | |
| 5,729,617 A | 3/1998 | Gruber | |
| 6,020,805 A | 2/2000 | Barja | |
| 6,359,997 B2 | 3/2002 | Geisenberger et al. | |
| 6,636,612 B1 | 10/2003 | North et al. | |
| 7,065,225 B2 | 6/2006 | Stiles | |
| 7,088,841 B2 | 8/2006 | Kallen | |
| 7,197,155 B2 | 3/2007 | Bank | |
| 7,477,757 B2 | 1/2009 | Stiles | |
| 7,574,013 B2 | 8/2009 | Funahashi et al. | |
| 8,009,857 B2 | 8/2011 | Bohlender et al. | |
| 8,363,881 B2 | 1/2013 | Godkin | |
| 8,385,580 B2 | 2/2013 | Adamson | |
| 8,995,703 B2 | 3/2015 | Ilkorur | |
| 9,071,898 B2 | 6/2015 | Cazes Bouchet | |
| 2004/0131223 A1 | 7/2004 | Stiles | |
| 2006/0239499 A1 | 10/2006 | Stiles | |
| 2007/0121994 A1 | 5/2007 | Hayasaka et al. | |
| 2011/0243364 A1 | 10/2011 | Walter | |
| 2012/0008817 A1* | 1/2012 | Grinker | H01F 7/14 381/409 |
| 2013/0108099 A1 | 5/2013 | Kemmerer et al. | |
| 2017/0280248 A1 | 9/2017 | Kuze et al. | |
| 2022/0225001 A1* | 7/2022 | Huyck | H04R 1/023 |

FOREIGN PATENT DOCUMENTS

WO 2019226323 A1 11/2019

* cited by examiner

*Primary Examiner* — Tuan D Nguyen
(74) *Attorney, Agent, or Firm* — Seth L. Hudson; Maynard Nexsen PC

(57) ABSTRACT

A magnetic assembly for speaker device that includes a housing, a pole piece with an exterior surface, at least one magnet engaged to the exterior surface of the pole piece, and an air gap disposed between the pole piece and an interior surface of the housing.

10 Claims, 23 Drawing Sheets

MOTOR ASSEMBLY FOR SPEAKER DEVICE

FIELD OF THE INVENTION

The present invention relates generally to a motor assembly for a speaker device, and more generally relates to a motor assembly with a plurality of magnets engaged to the exterior surface of a pole piece with an optional shroud surrounding the plurality of magnets and a voice coil assembly encircling the pole piece and positioned external to the magnets and optional shroud.

BACKGROUND OF THE INVENTION

Audio speakers are well known and widely used for transmitting audio sound. Audio speakers use electrical signals to produce air pressure waves which are perceived as sounds. Audio speakers may use a diaphragm that is movably suspended in a frame. The diaphragm is coupled to a voice coil that is suspended in a magnetic field. The electrical signals representing the sound flow through the voice coil and interact with the magnetic field. This causes the voice coil and the coupled diaphragm to oscillate in response to the electrical signal. The oscillation of the diaphragm produces air pressure waves.

There is a need for an improved motor assembly that produces an enhanced magnetic field over the prior art.

BRIEF SUMMARY OF THE INVENTION

According to an embodiment of the present invention, a motor assembly includes a housing, a pole piece with an exterior surface, at least one magnet engaged to the exterior surface of the pole piece, and an air gap disposed between the pole piece and an interior surface of the housing.

According to yet another embodiment of the present invention, the motor assembly includes a pole piece that is generally circular and the at least one magnet contains a radius of curvature that is identical to the radius of curvature of the exterior surface of the pole piece According to yet another embodiment of the present invention, the motor assembly includes magnets engaged to the exterior surface of the pole piece with an adhesive.

According to yet another embodiment of the present invention, the motor assembly includes a voice coil assembly disposed within the air gap.

According to yet another embodiment of the present invention, the motor assembly includes a shroud that encircles the pole piece and disposed adjacent an exterior surface of the magnets.

According to yet another embodiment of the present invention, the motor assembly includes at least one neo-magnet.

According to yet another embodiment of the present invention, the motor assembly includes a voice coil assembly that contains a length shorter than the length of the at least one magnet.

According to yet another embodiment of the present invention, the motor assembly includes a voice coil assembly that contains a length greater than the length of the at least one magnet.

According to yet another embodiment of the present invention, the motor assembly includes a housing with a bottom portion and a side portion, and a pole piece with an exterior surface. A plurality of magnets are spaced-apart from each other with an interior surface and an exterior surface, the interior surface of each magnet is engaged to the exterior surface of the pole piece. An air gap is disposed between the pole piece and an exterior surface of the side portion, and a voice coil assembly disposed within the air gap and engaged to the exterior surface of each magnet and surrounding the magnets engaged to the pole piece.

According to yet another embodiment of the present invention, the motor assembly includes a plurality of magnets spaced an equal distance apart from each other around the exterior surface of the pole piece.

According to yet another embodiment of the present invention, the motor assembly includes magnets not engaged to a structure for supporting the magnets.

According to yet another embodiment of the present invention, the motor assembly includes a pole piece that contains a centrally located, hollow bore, wherein a first portion of the bore contains a constant diameter and a second portion of the bore gradually increases in diameter to an end of the bore.

According to yet another embodiment of the present invention, the motor assembly wherein the magnets have a generally triangular shape.

According to yet another embodiment of the present invention, the motor assembly includes a diaphragm assembly, a housing with a bottom portion and a side portion, and a pole piece with an exterior surface. A plurality of magnets are spaced-apart from each other with an interior surface and an exterior surface, the interior surface of each magnet is engaged to the exterior surface of the pole piece. An air gap is disposed between the pole piece and an exterior surface of the side portion, and a voice coil assembly disposed within the air gap.

According to yet another embodiment of the present invention, the motor assembly includes a shroud composed of metal that encircles the pole piece and is disposed adjacent the exterior surface of the magnets.

According to yet another embodiment of the present invention, the motor assembly includes magnets arranged in at least two rows along the exterior surface of the pole piece.

According to yet another embodiment of the present invention, the motor assembly includes a voice coil assembly engaged to the exterior surface of the magnets.

According to yet another embodiment of the present invention, the motor assembly includes a voice coil assembly engaged to the exterior surface of the shroud, and the interior surface of the shroud is engaged to the exterior surface of the magnets.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
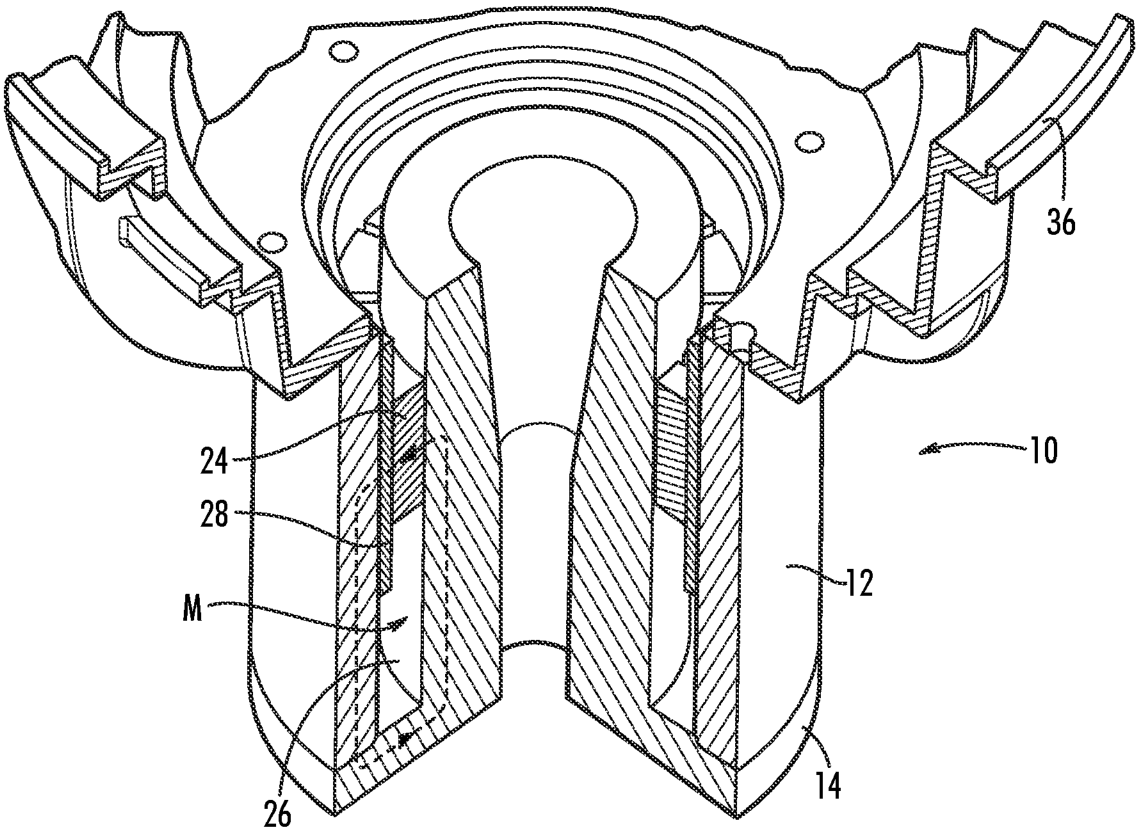
FIG. 1 is a partial cut-away view of the motor assembly of the present invention engaged to a diaphragm assembly.
Figure 2:
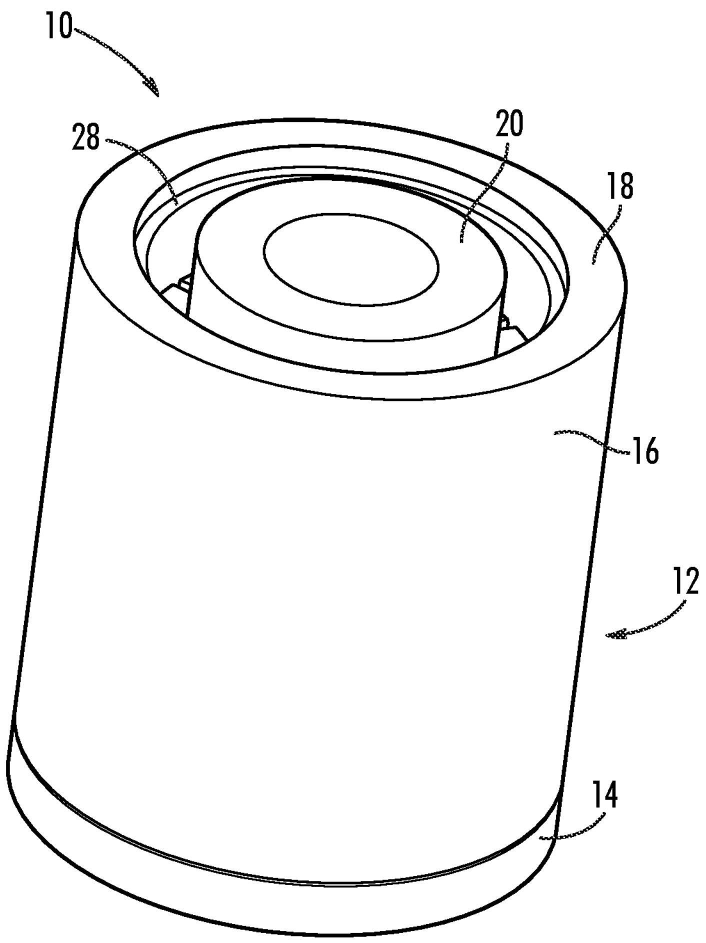
FIG. 2 is a perspective view of a motor assembly of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring now specifically to the drawings, a motor assembly is illustrated in FIGS. 1-8 and is shown generally at reference numeral 10. The motor assembly 10 is housed within a housing 12 that comprises a bottom portion 14 that extends to an outer edge. A cylindrical side portion 16 extends generally upward from the outer edge to an upper edge 18. The housing 12 can consist of two separate portions consisting of the bottom portion 14 and the side portion 16, which are engaged to each other by an attachment means, such as a bolt, screw, or the like. On the other hand, the housing 12 may be an integral unit, with the bottom portion 14 and the side portion 16 integral with each other.

Figure 3:
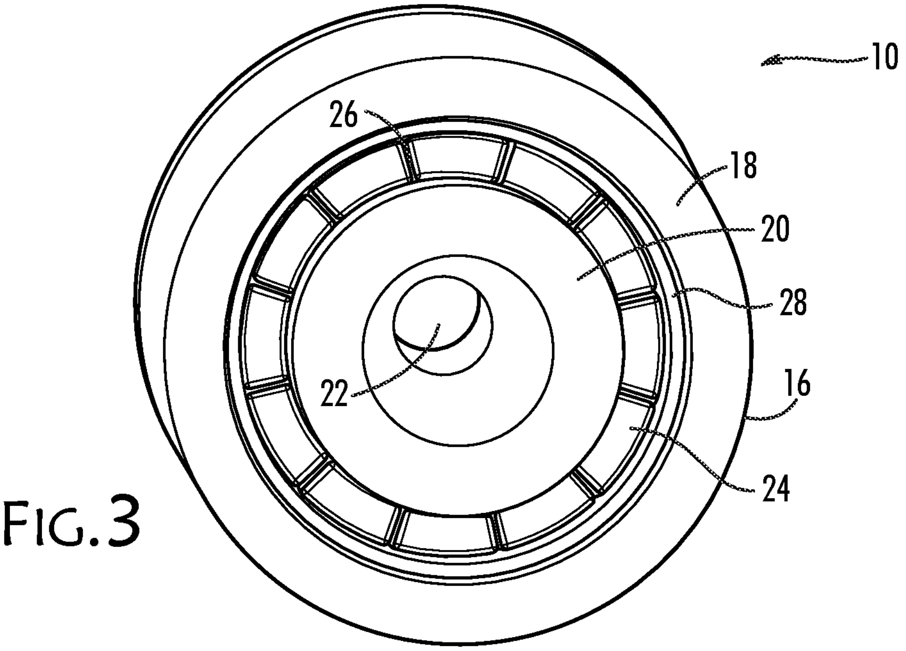
FIG. 3 is a top perspective view of the motor assembly of the present invention.
Figure 4:
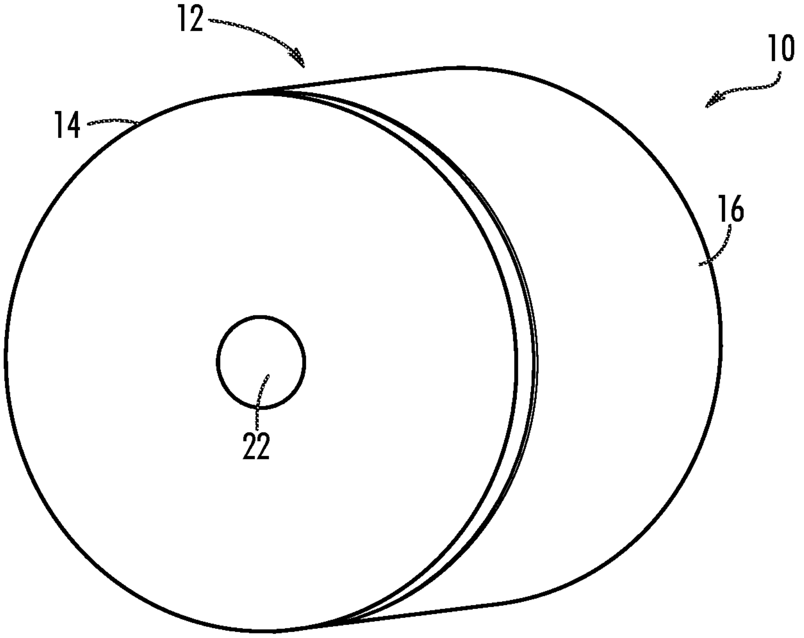
FIG. 4 is a bottom perspective view of the motor assembly of the present invention.
Figure 7:
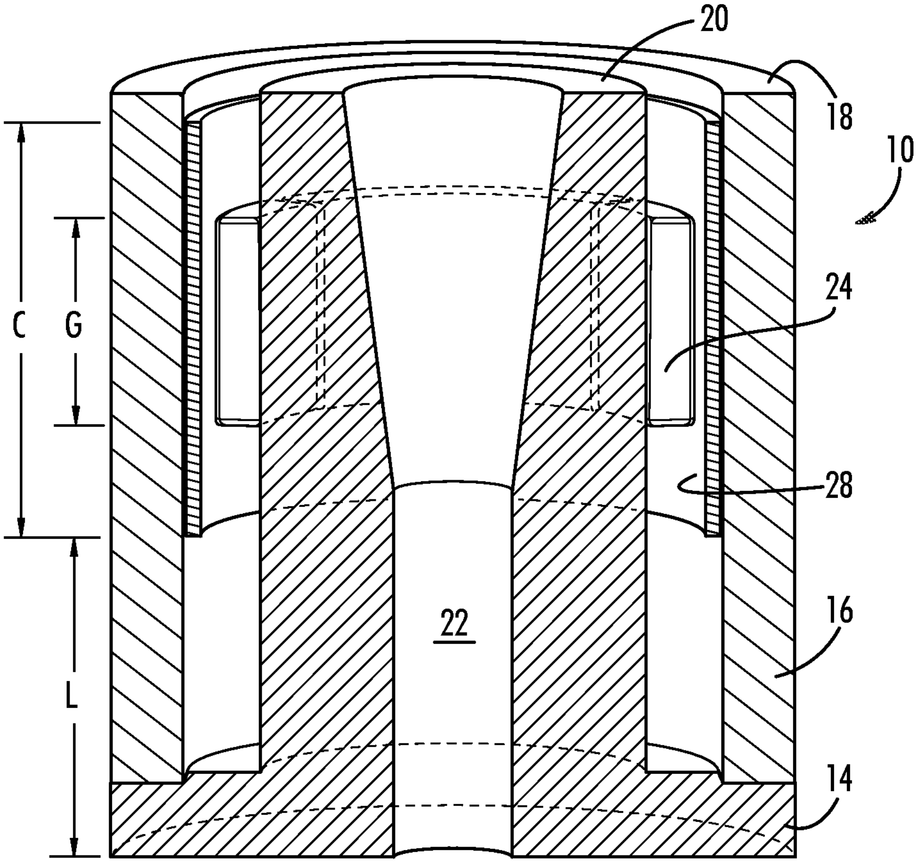
FIG. 7 is a cut-away view of the motor assembly of the present invention.

The bottom portion 14 and the side portion 16 each contain an exterior side and an interior side. A pole piece 20 extends upward from the interior side of the bottom portion 14. The pole piece 20 has a first end and a second end. The pole piece 20 is centrally located within the housing 12 and the exterior surface of the pole piece 20 is generally cylindrical. The first end is engaged to the interior side of the bottom portion 14, and the second end extends upward and has a generally planar relationship with the upper edge 18 of the side portion 16. As shown in FIGS. 3 and 7, the pole piece 20 contains an internal, centrally located, hollow bore 22 that extends from the second end to the first end of the pole piece 20. The bore 22 extends to the exterior side of the bottom portion 14.

The pole piece 20 has an external surface that is generally cylindrical or cylindrical. The centrally located, hollow bore 22 is disposed within the pole piece 20, wherein a first portion of the bore 22, containing an inlet on the exterior surface of the bottom portion 14 of the housing 12, has a constant diameter and a second portion, gradually increases in diameter to an inlet at the uppermost portion of the second end of the pole piece 20, wherein the inlet of the bore 22 at the uppermost portion of the second end of the pole piece 20 has a greater diameter than the inlet of the bore 22 at the bottom portion 14 of the housing 12. As shown in FIG. 7, the bore 22 extends a length L from the inlet at the bottom portion 14 of the housing 12 and contains a constant diameter; thereafter, the diameter of the bore 22 gradually increases until the inlet at the uppermost portion of the second end of the pole piece 20.

Figure 5:
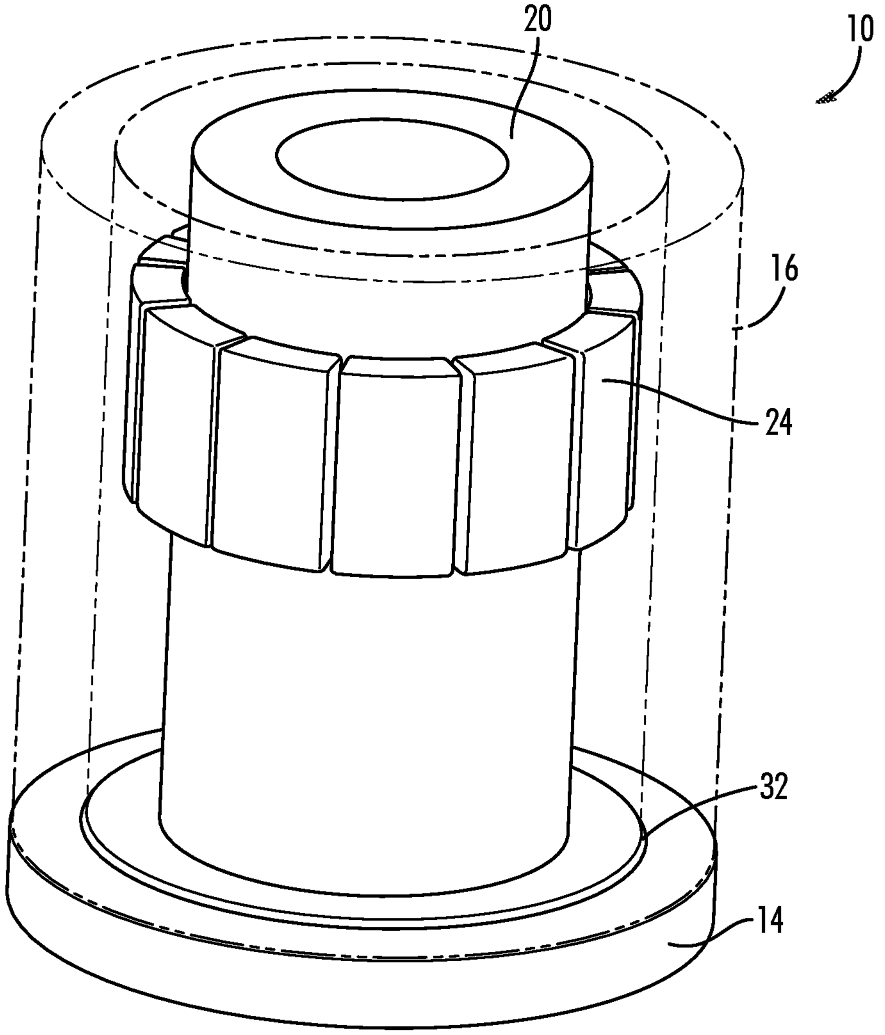
FIG. 5 is a perspective view of the motor assembly of the present invention with an invisible view of the voice coil assembly and side portion.
Figure 6:
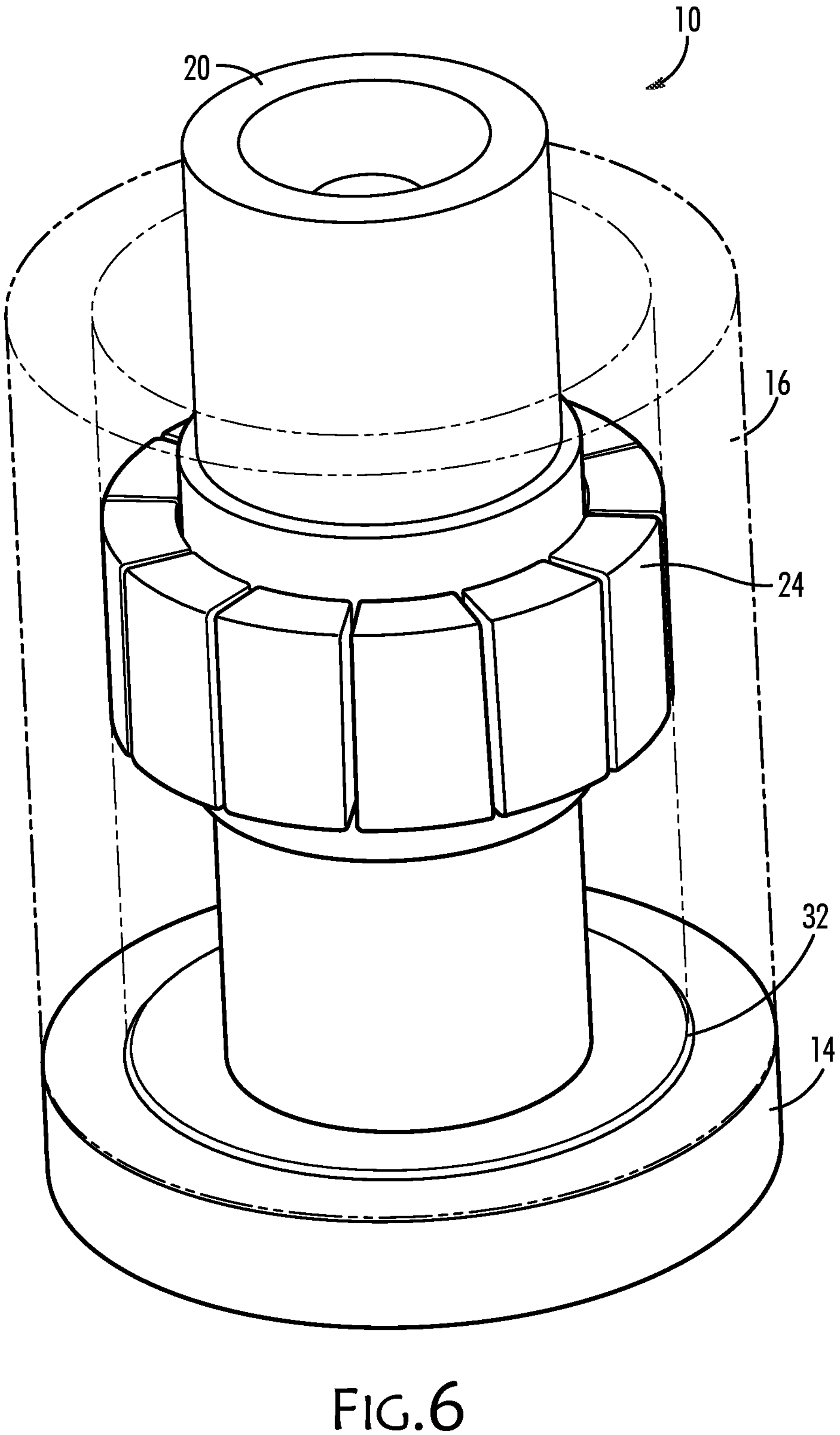
FIG. 6 is a perspective view of the motor assembly of the present invention with an invisible view of the side portion.

At least one magnet 24 is engaged to the exterior surface of the pole piece 20. As illustrated in FIGS. 1, 5 and 7, a plurality of magnets 24 are engaged to the exterior surface of the pole piece 20, and specifically, the plurality of magnets 24 are engaged to the exterior surface of the pole piece 20, spaced an equal distance apart, resulting in a plurality of magnets 24 surrounding the exterior surface of the pole piece 20, except for the voids 26 between each magnet 24. The interior surface of the magnets 24 are engaged to the pole piece 20 by an adhesive or a mechanical device, such as screw, bolt, strap, or the like. Since the magnets 24 are engaged or adhered to the pole piece 20, a shelf or other structure that retains or supports the magnets 24 for positioning the magnets 24 in close proximity to the pole piece 20 is not needed. Preferably, the magnets 24 of the present invention are a neodymium magnet ("neo magnet'), which is a permanent magnet made from an allow of neodymium, iron, and boron to form a $Nd_2Fe_{14}B$ tetragonal crystalline structure. The neo magnet may be plated or coated prior to use in the present invention. Commonly, the neo magnet may be nickel plated. In this embodiment, illustrated in FIGS. 1-8, the magnets 24 may all have the same size, shape, and dimensions.

A voice coil assembly 28 is adjacent the exterior surface of the magnets 24, as shown in FIGS. 3 and 7. The interior surface of the magnets 24 are engaged to the pole piece 20 and the voice coil in the voice coil assembly 28 is positioned adjacent the exterior surface of the magnets 24, meaning the magnets 24 are internal the voice coil. The void 26 between each magnet 24 extends from the external surface of the pole piece 20 to the voice coil assembly 28 that surrounds the exterior surface of the magnets 24. An air gap 30 is located between the exterior surface of the magnets 24 and the interior side of the side portion 16 of the housing 12. As shown in FIG. 1, magnetization M is produced by the magnets 24 in the area shown in this embodiment.

Figure 8:
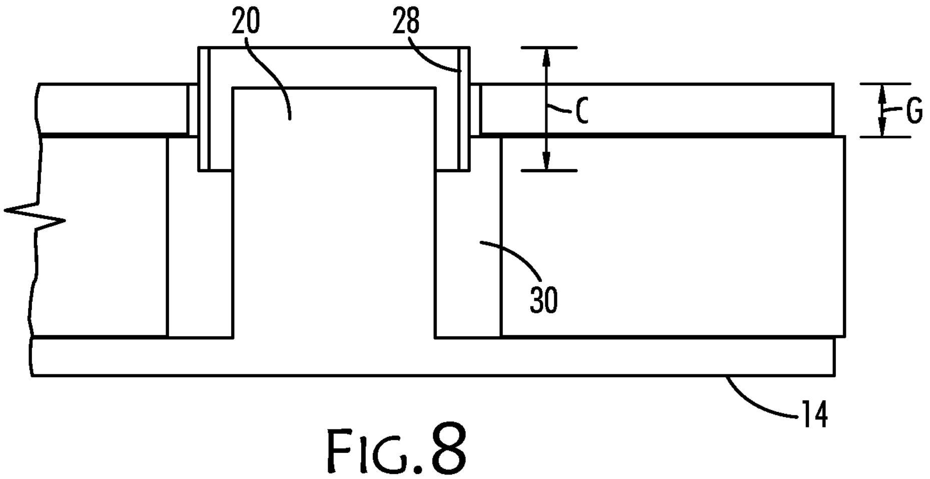
FIG. 8 is a cut-away side view of the motor assembly of the present invention.

The voice coil assembly 28 is positioned within the air gap 30, as shown in FIG. 8. The voice coil assembly 28 preferably comprises a voice coil and bobbin, which may be of any size and shape depending upon the desires of the user. However, the voice coil assembly 28 may only consist of the voice coil in the present invention. The voice coil is preferably composed of copper, engaged to the exterior surface of each magnet 24, and surrounds all of the magnets 24 engaged to the pole piece 20.

The bottom portion 14 and the side portion 16 of the housing 12 are preferably composed of steel, but may be composed of another material as desired by the user.

Figure 20:
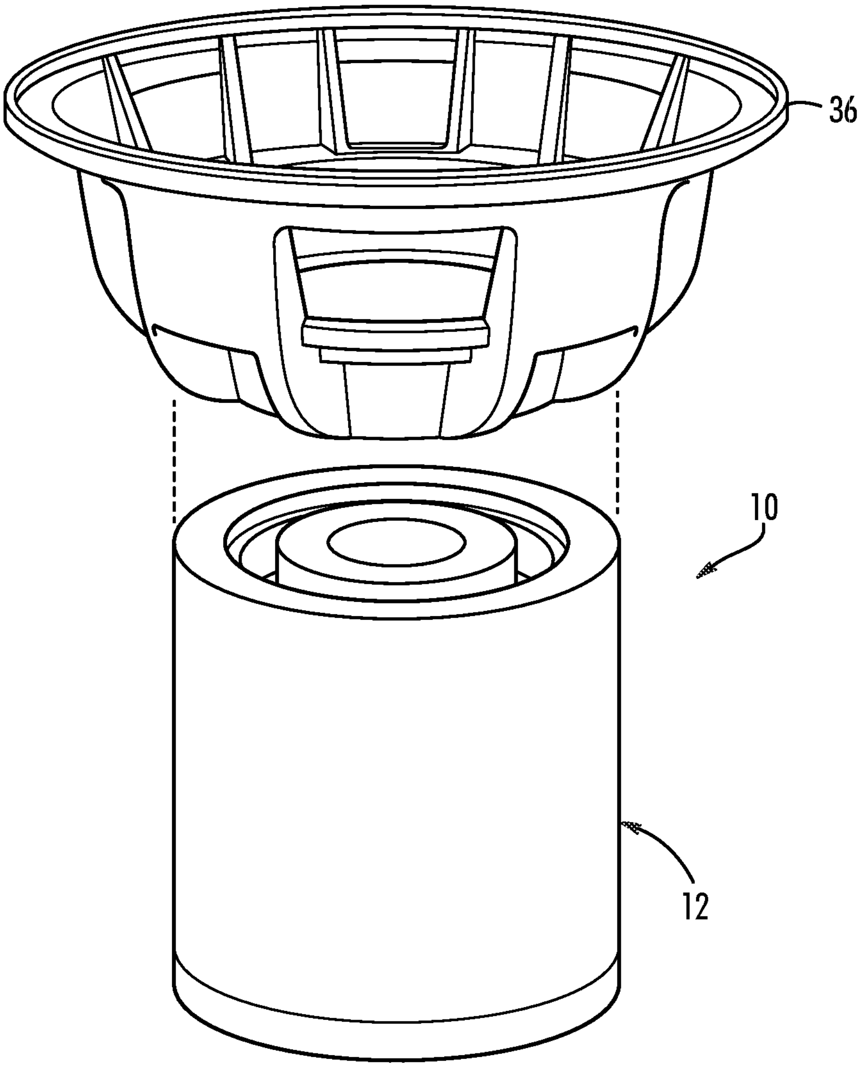
FIG. 20 is a perspective view of the alternative embodiment of FIG. 19 of the motor assembly of the present invention attached to a diaphragm assembly.
Figure 21:
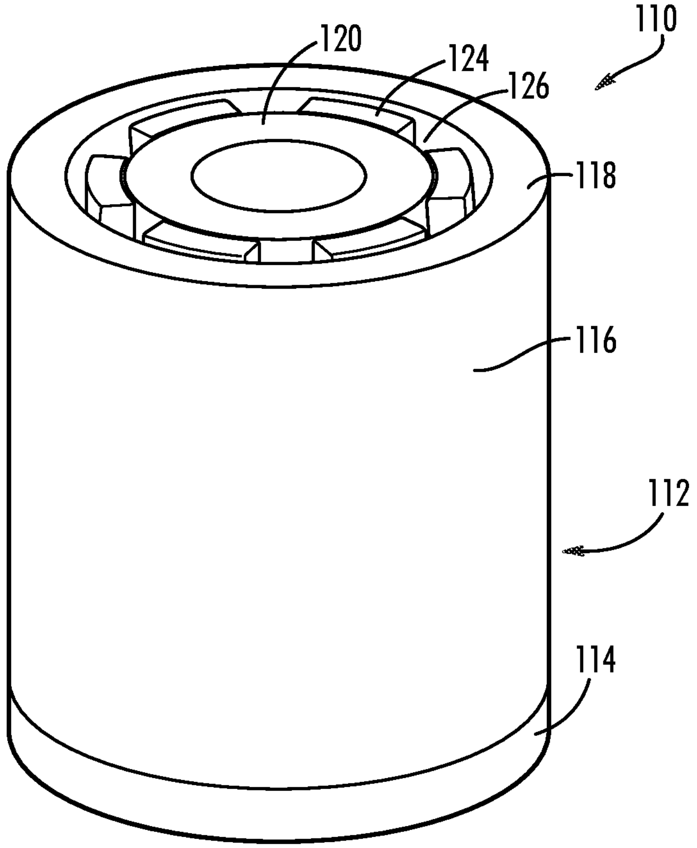
FIG. 21 is perspective view of the alternative embodiment of FIG. 19 of the motor assembly of the present invention.
Figure 22:
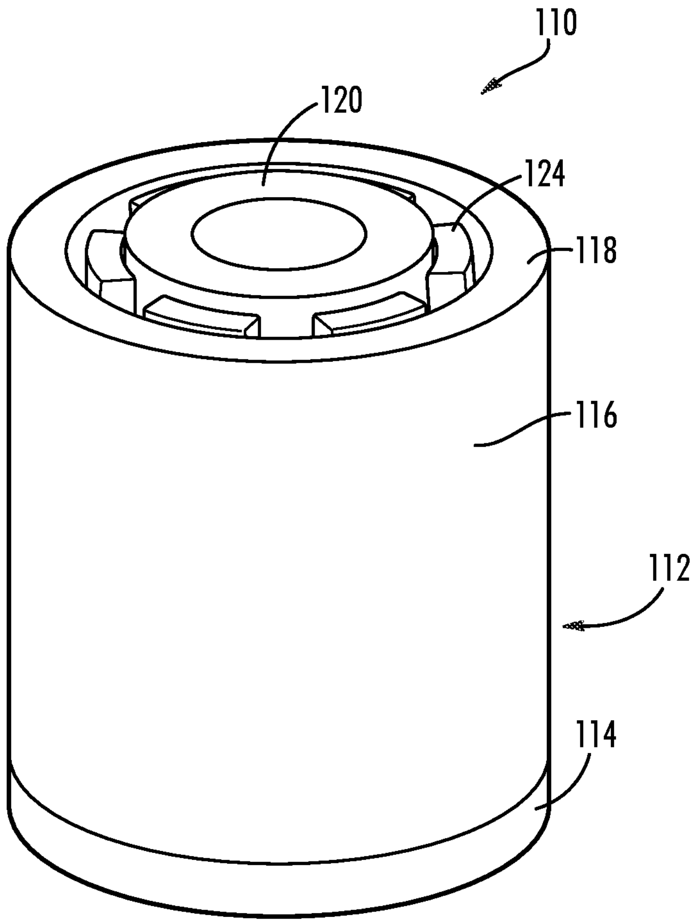
FIG. 22 is a perspective view of the alternative embodiment of FIG. 19 of the motor assembly of the present invention.
Figure 23:
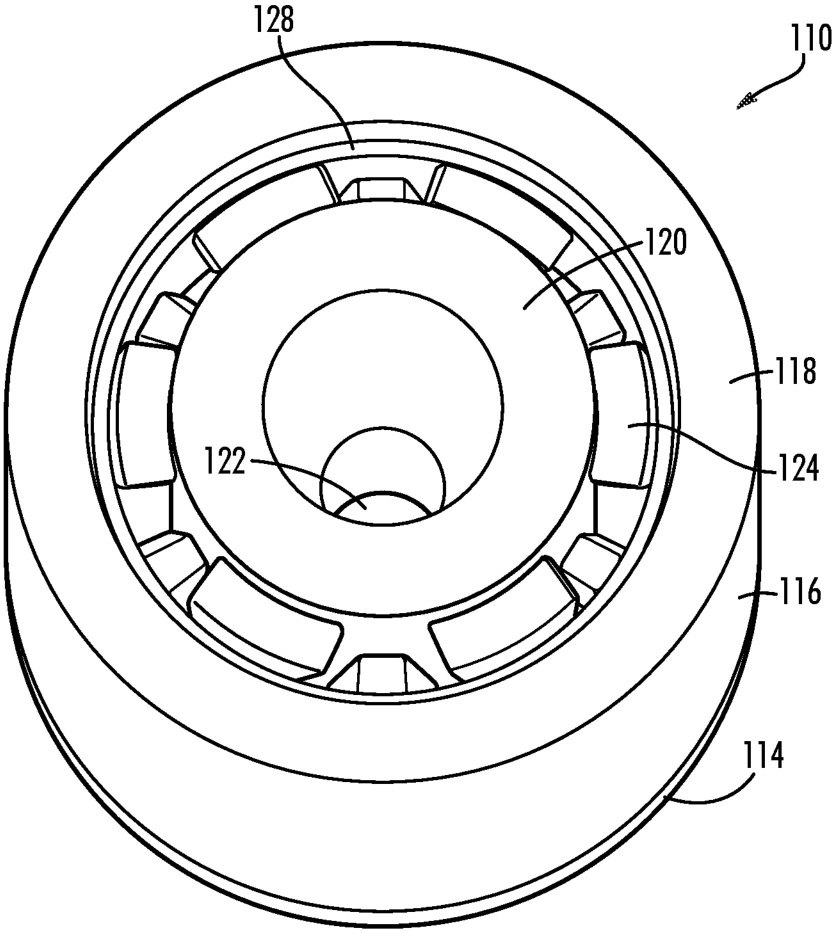
FIG. 23 is a top perspective view of the alternative embodiment of FIG. 17 of the motor assembly of the present invention.
Figure 24:
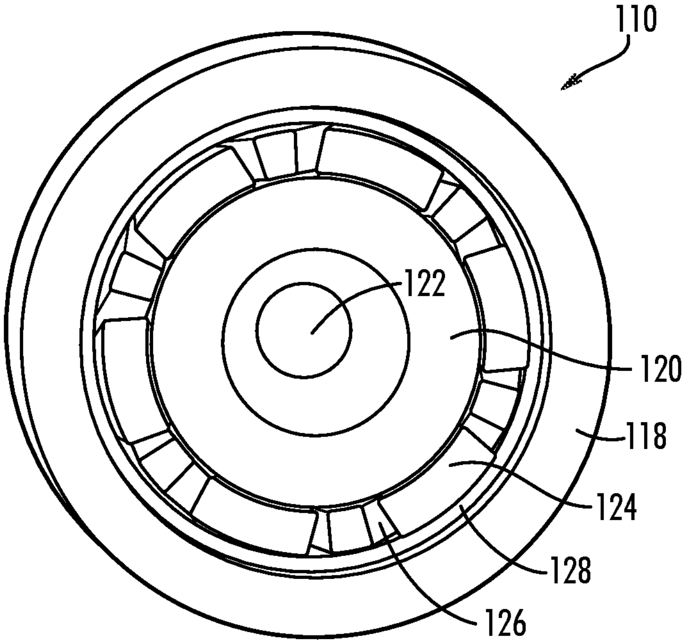
FIG. 24 is a top view of the alternative embodiment of FIG. 17 of the motor assembly of the present invention.
Figure 25:
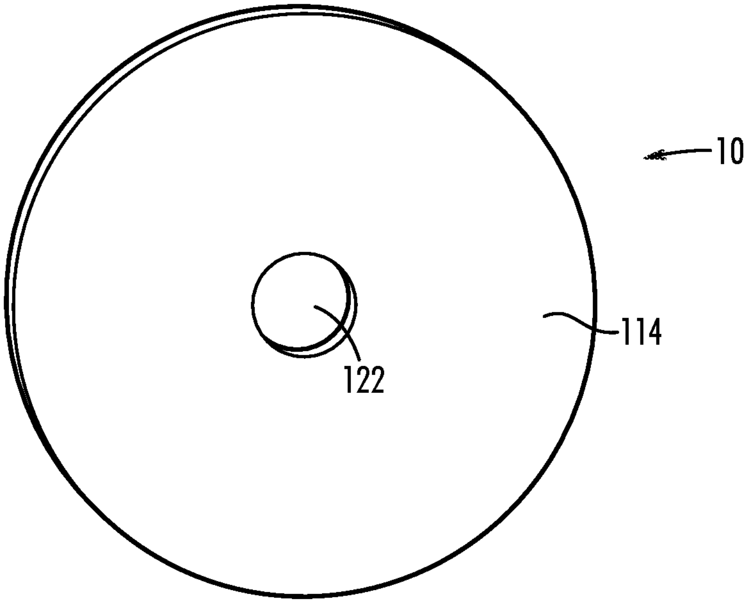
FIG. 25 is a bottom view of the alternative embodiment of FIG. 17 of the motor assembly of the present invention.

The motor assembly 10 is housed together with a diaphragm assembly 36, as shown in FIG. 20 as a different embodiment, and collectively forming an audio speaker system. The diaphragm assembly 36 preferably comprises a diaphragm, surround and spider. These components may have a number of different designs and configurations based upon the desires of the user. The diaphragm assembly 36 is engaged to the voice coil assembly 28 for transferring reciprocating motion during operation. In other words, the motor assembly 10 is configured to cause reciprocation axial movement of the diaphragm assembly 36 through the voice coil assembly 28. As a result, the diaphragm assembly 36 generates sound waves through the pressure exerted on ambient air.

As illustrated in FIG. 5, the interior surface of the magnets 24 preferably have a radius of curvature the same as or similar to that of the exterior surface of the pole piece 20. The interior surface of the magnets 24 may have the same as or similar radius of curvature as the external surface of the pole piece 20, allowing the interior surface of the magnet 24 to engage the pole piece 20 without any gaps or areas of separation between the interior surface of the magnet 24 and the exterior surface of the pole piece 20. The exterior surface of the magnets 24 may also a radius of curvature the same as or similar to that of the exterior surface of the pole piece 20.

The length of the magnets 24 may be shorter than the length of the voice coil assembly 28, as shown in FIGS. 1-8. The top portion of the voice coil assembly 28 extends above the top portion of each magnet 24, and the bottom portion of the voice coil assembly 28 extends below the bottom portion of each magnet 24. In this embodiment, the magnets 24 may be generally rectangular or generally square shaped and have a radius of curvature as described above. This embodiment is referred to as the overhung position and a cross-sectional view is shown in FIG. 8, wherein the ring of magnets 24 around the pole piece 20 forms the gap. The coil height is indicated by C and the gap height G.

Figure 9:
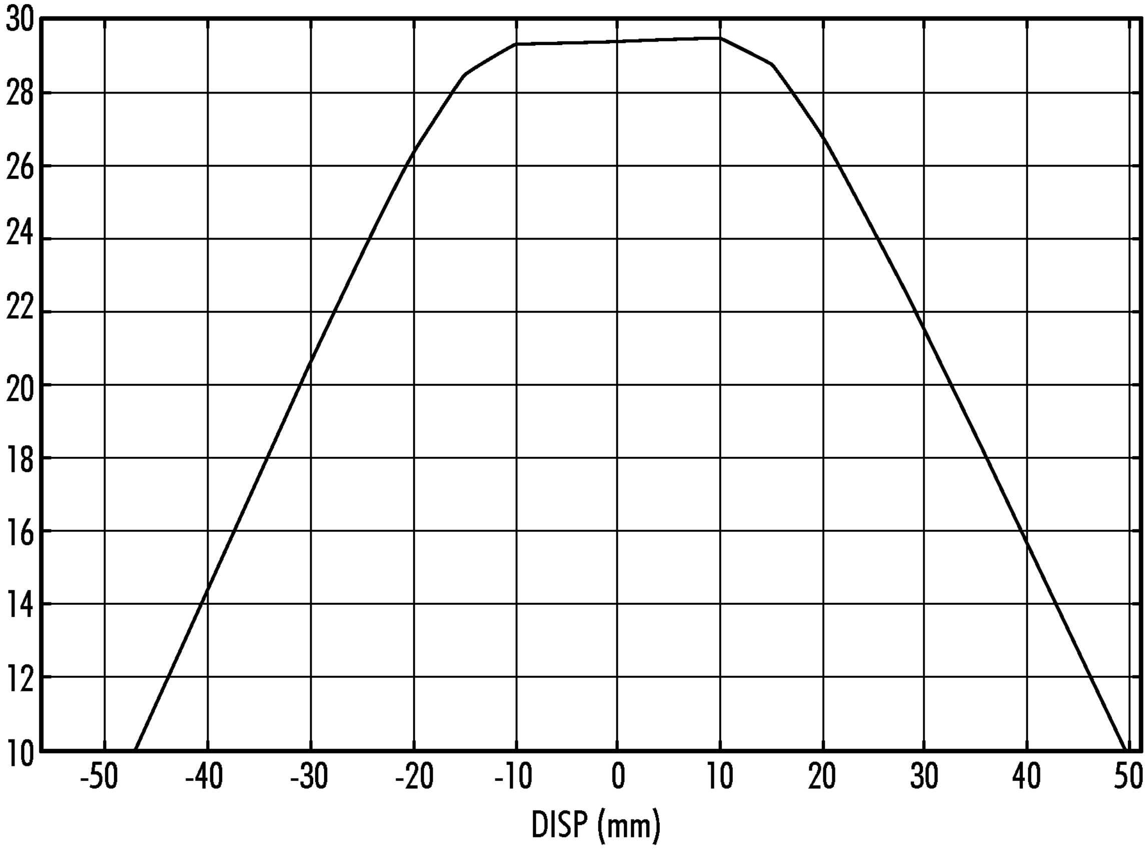
FIG. 9 is a graph illustrating the motor force versus the displacement at the voice coil.

The motor assembly 10 forms a force actuator and exerts force when current is applied to the voice coil. A B1(x) plot is shown in FIG. 9 illustrating the product of the B-field and the length (L) of the voice coil. Displacement is shown on the x-axis and motor force is shown on the y-axis, the motor force versus the displacement at the voice coil is shown. The graph of FIG. 9 shows how much force the motor assembly 10 generates per unit of current (Ampere) throughout the displacement range or position of the voice coil.

Figure 10:
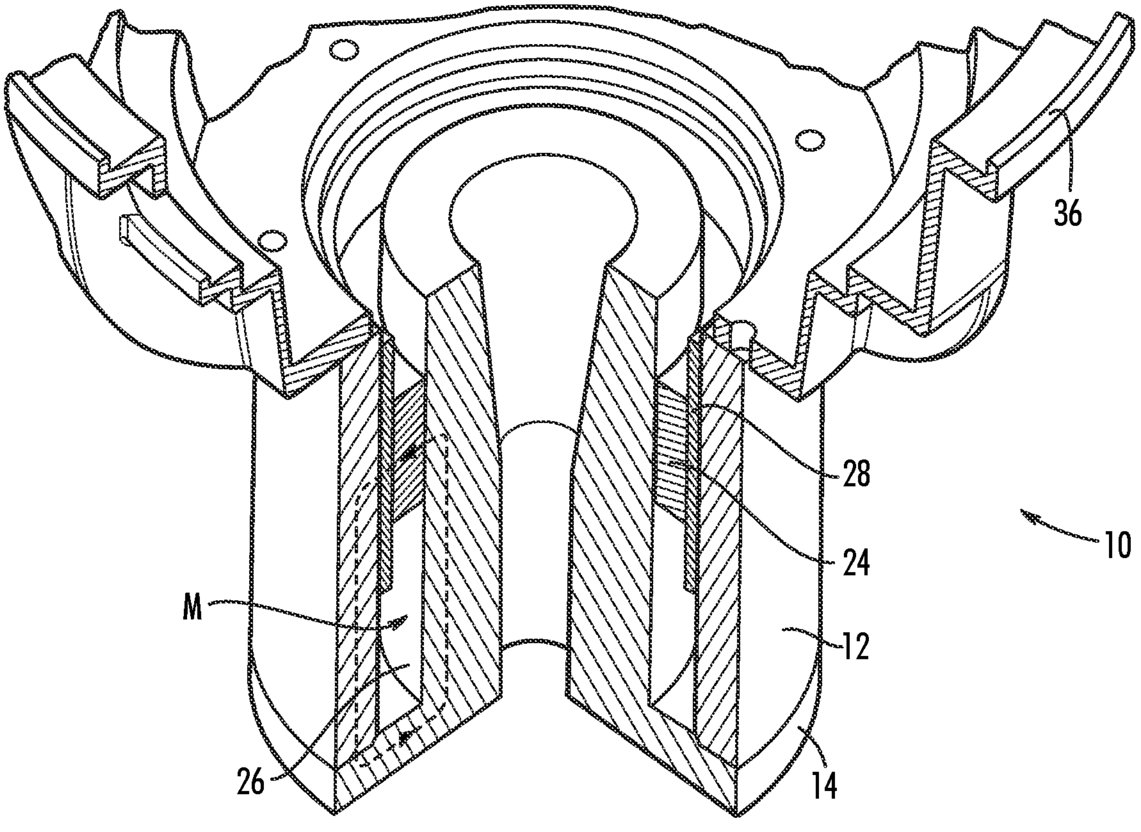
FIG. 10 is a partial cut-away view of an alternative embodiment of the motor assembly of the present invention engaged to a diaphragm assembly.
Figure 11:
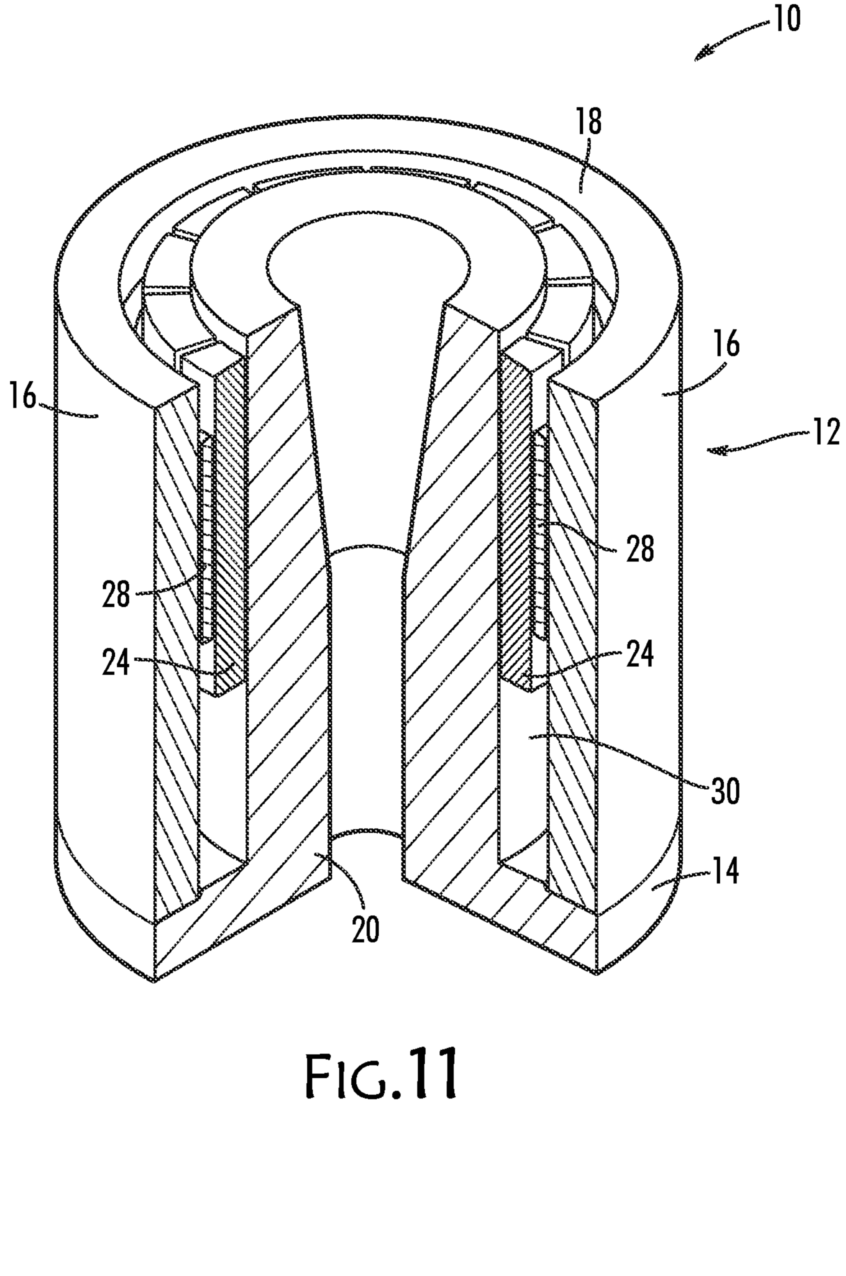
FIG. 11 is a partial cut-away view of the alternative embodiment of the motor assembly of the present invention.

An alternative embodiment is illustrated in FIG. 10 that contains all of the above described features for the embodiment in FIGS. 1-8. In this embodiment, a plurality of magnets 24 are not engaged to the pole piece 20. Instead, a single magnet 24 that is circular, replaces the plurality of magnets 24. In this embodiment, the interior surface of the magnet 24 is engaged to the external surface of the pole piece 20 and the voice coil assembly 28 is positioned adjacent the exterior surface of the magnet 24. The magnet 24 has a diameter slightly larger than the diameter of the pole piece 20 and encircles the pole piece 20.

Figure 14:
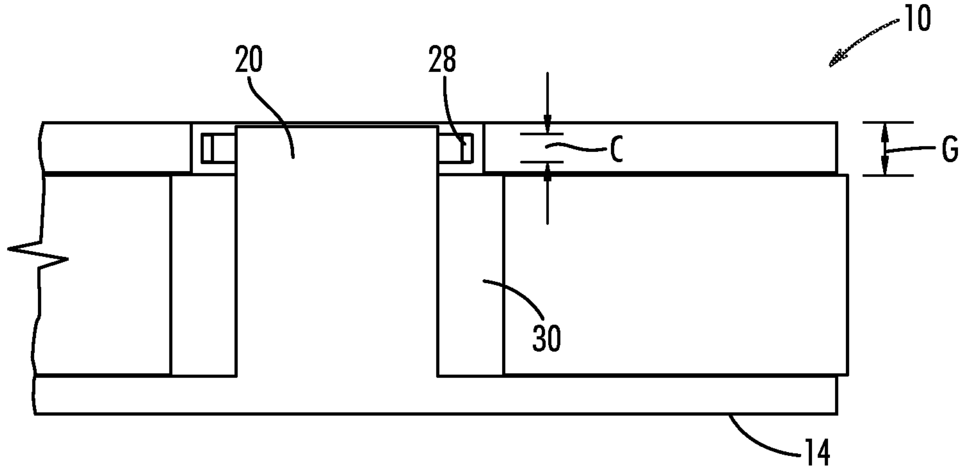
FIG. 14 is a cut-away side view of the alternative embodiment of FIG. 11 of the motor assembly of the present invention.

In another embodiment, as shown in FIGS. 11-14, the magnets 24 are longer than the width of the voice coil assembly 28. In this embodiment, that contains all the above described features in FIGS. 1-8, a portion of each magnet 24 extends above the top portion of the voice coil assembly 28, and a portion of each magnet 24 extends below the bottom portion of the voice coil assembly 28. The magnets 24 are all equal length and of the same size. As shown, the magnets 24 are generally rectangularly shaped and have a radius of curvature as described above. This embodiment is referred to as the underhung position and a cross-sectional view is shown in FIG. 14, wherein the ring of magnets 24 around the pole piece 20 forms the gap. The coil height is indicated by C and the gap height G.

Figure 12:
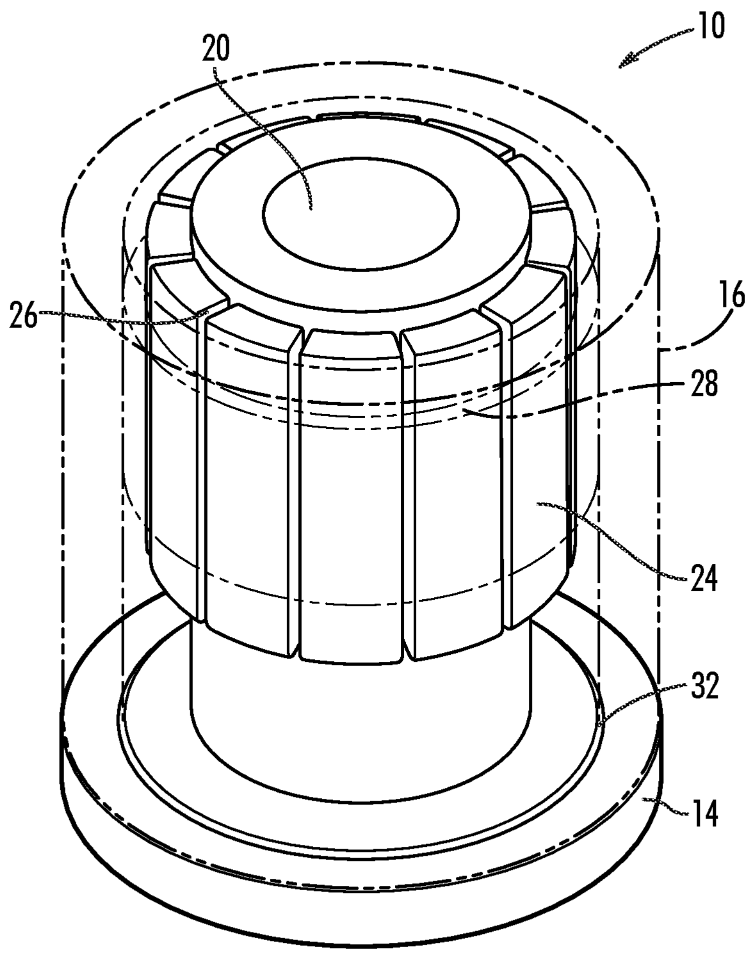
FIG. 12 is a perspective view of the alternative embodiment of FIG. 111 of the motor assembly of the present invention with an invisible view of the voice coil assembly and side portion.
Figure 13:
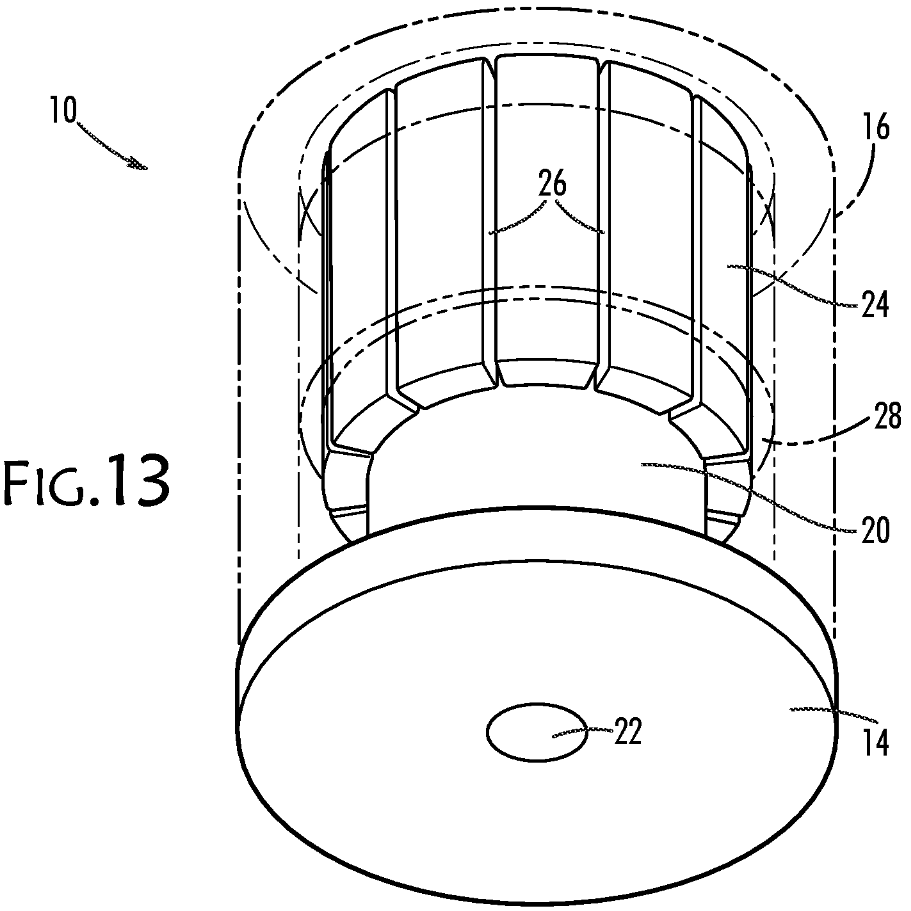
FIG. 13 is a bottom perspective view of the alternative embodiment of FIG. 11 of the motor assembly of the present invention with an invisible view of the side portion.

The bottom portion 14 of the above mentioned embodiments may be engaged to the side portion 16 by an attachment device, such as a bolt or screw. Preferably, the attachment device is countersunk in the bottom portion 14. A plurality of holes may be dispersed along the upper edge 18 for engaging a diaphragm assembly 36. The interior surface of the bottom portion 14 contains a lip 32, as shown in FIG. 12, for positioning the side portion 16 on the bottom portion 14 and securing the bottom portion 14 in place. The lip 32 on the bottom portion is circular and preferably disposed on the interior side of the bottom portion at a distance slightly greater than the width of the pole piece 20. The width of the pole piece 20 is the distance from its exterior surface to its interior surface, allowing the exterior surface of the pole piece 20 to be flush with the outer edge of the bottom portion 14. The bottom portion 14 contains two concentric sections on its interior side that have different heights, which is the distance between the exterior side to the interior side of the bottom portion 14, the lip 32 forms the transition between the two concentric sections. The first concentric section is adjacent the pole piece 20 and has a height greater than the height of the second concentric section that is adjacent the outer edge of the bottom portion 14. The bottom edge of the first end of the pole piece 20 is disposed on the second concentric section of the interior side of the bottom portion 14 with the lip 32 adjacent a portion of the interior side of the side portion 16.

An optional shroud with an internal surface and an external surface may be disposed around the exterior surface of the magnets 24. The shroud circles the pole piece 20 and may be engaged to the exterior surface of at least one magnet 24, two or more magnets 24, a plurality of magnets 24, or all of the magnets 24 engaged to the pole piece 20. The shroud may be a thin metal sheet, composed of aluminum, copper, steel, or the like, encircling the pole piece 20 and engaged to the exterior surface of the magnets 24. When the optional shroud is utilized, the voice coil assembly 28 surrounds the exterior surface of the shroud.

Another alternative embodiment is illustrated in FIGS. 15-18, 23-26. In this embodiment, the motor assembly 110 is housed within a housing 112 that comprises a bottom portion 114 that extends to an outer edge. A cylindrical side portion 116 extends generally upward from the outer edge to an upper edge 118. The housing 112 can consist of two separate portions consisting of the bottom portion 114 and the side portion 116, which are engaged to each other by an attachment means, such as a bolt, screw, or the like. On the other hand, the housing 112 may be an integral unit, with the bottom portion 114 and the side portion 116 integral with each other.

Figure 15:
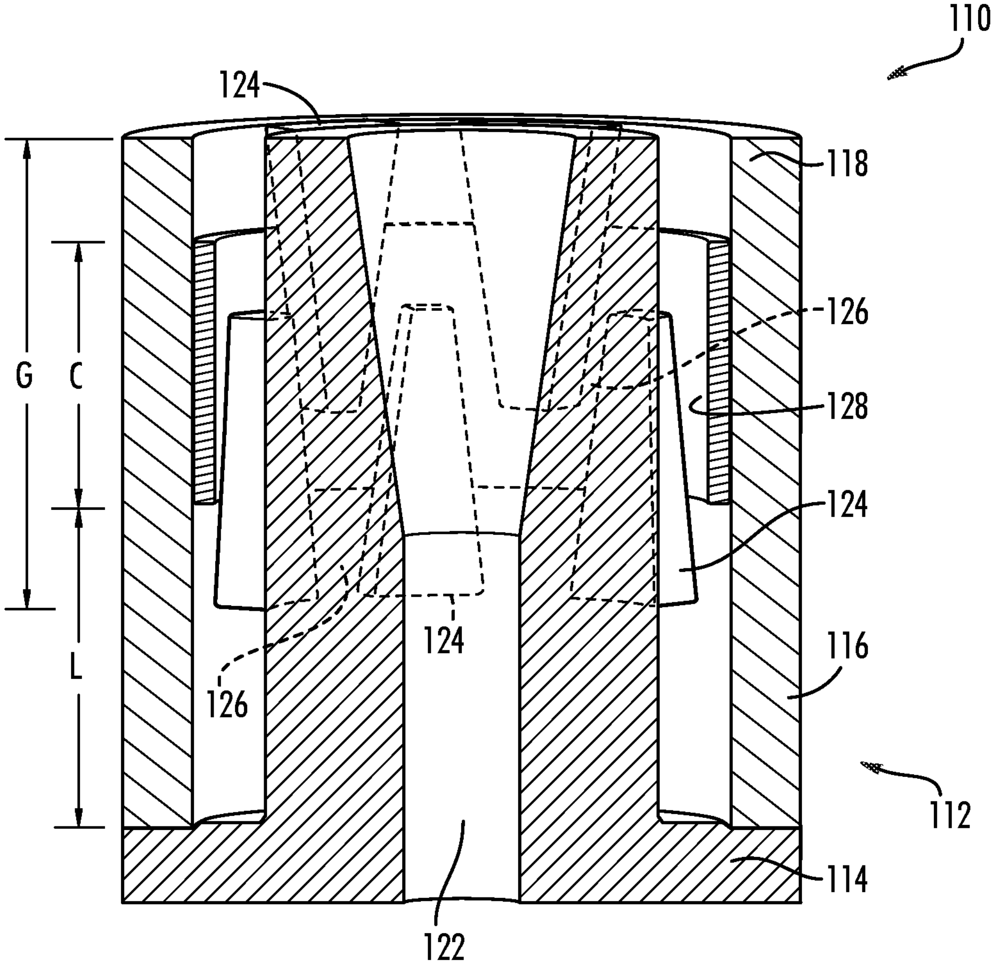
FIG. 15 is a cut-away side view of another alternative embodiment of the motor assembly of the present invention.
Figure 16:
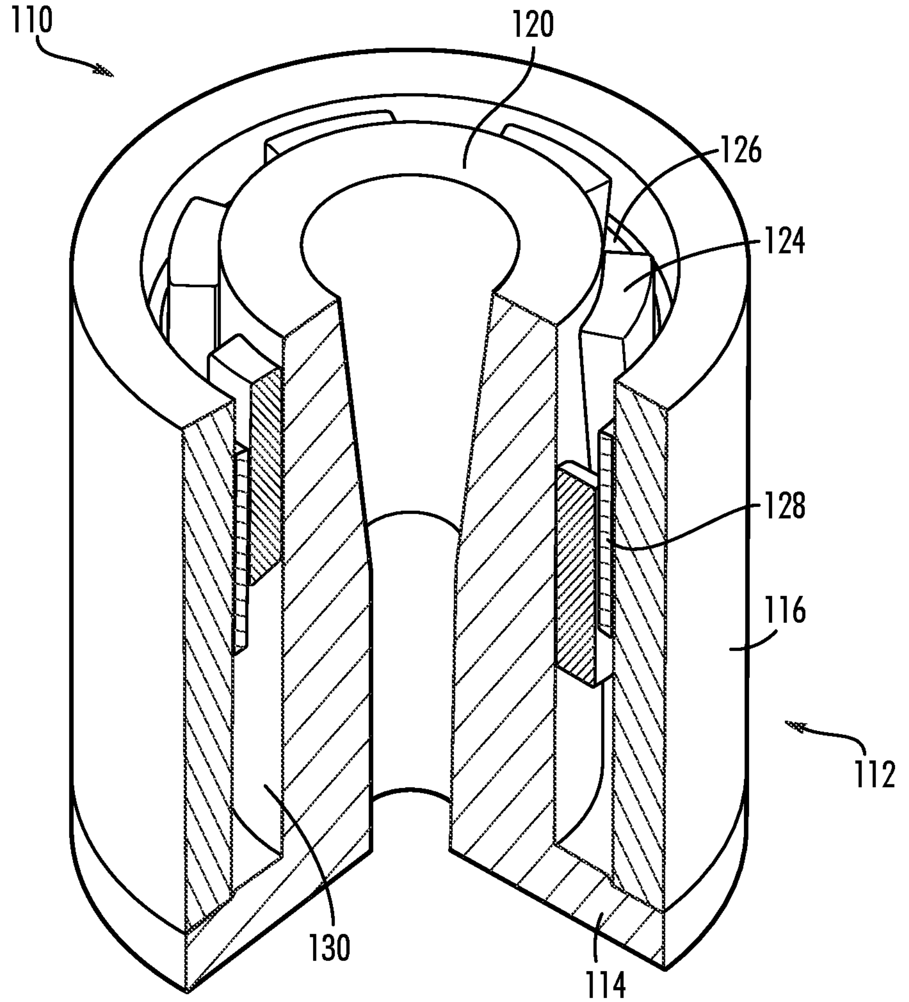
FIG. 16 is a partial cut-away view of the alternative embodiment of FIG. 15 of the motor assembly of the present invention.

The bottom portion 114 and the side portion 116 each contain an exterior side and an interior side. A pole piece 120 extends upward from the interior side of the bottom portion 114. The pole piece 120 has a first end and a second end. The pole piece 120 is centrally located within the housing 112 and the exterior surface of the pole piece 120 is generally cylindrical. The first end is engaged to the interior side of the bottom portion 114, and the second end extends upward and has a generally planar relationship with the upper edge 118 of the side portion 116. As shown in FIGS. 15 and 16, the pole piece 120 contains an internal, centrally located, hollow bore 122 that extends from the second end to the first end of the pole piece 120. The bore 122 extends to the exterior side of the bottom portion 114.

The pole piece 120 has an external surface that is generally cylindrical or cylindrical. The centrally located, hollow bore 122 is disposed within the pole piece 120, wherein a first portion of the bore 122, containing an inlet on the exterior surface of the bottom portion 114 of the housing 112, has a constant diameter and a second portion, gradually increases in diameter to an inlet at the uppermost portion of the second end of the pole piece 120, wherein the inlet of the bore 122 at the uppermost portion of the second end of the pole piece 120 has a greater diameter than the inlet of the bore 122 at the bottom portion 114 of the housing 112. As shown in FIG. 15, the bore 122 extends a length L from the inlet at the bottom portion 114 of the housing 112 and contains a constant diameter; thereafter, the diameter of the bore 122 gradually increases until the inlet at the uppermost portion of the second end of the pole piece 120.

At least one magnet 124 is engaged to the exterior surface of the pole piece 120. As illustrated in FIG. 15-18, a plurality of magnets 124 are engaged to the exterior surface of the pole piece 120, and specifically, the plurality of magnets 124 are engaged to the exterior surface of the pole piece 120, spaced an equal distance apart, resulting in a plurality of magnets 124 surrounding the exterior surface of the pole piece 120, except for the voids 126 between each magnet 124. The magnets 124 of this embodiment have a generally triangular shape, meaning the magnets 124 gradually increase in width from the first end to the second end. The magnets 124 have an interior surface, and exterior surface, a back surface, a front surface, and two, opposed side surfaces, extending from the front surface to the back surface, wherein as the side surfaces extend from the front surface to the back surface they diverge or gradually the distance between the side surfaces increases.

The interior surface of the magnets 124 are engaged to the pole piece 120 by an adhesive or a mechanical device, such as screw, bolt, strap, or the like. Since the magnets 124 are engaged or adhered to the pole piece 120, a shelf or other structure that retains or supports the magnets 124 for positioning the magnets 124 in close proximity to the pole piece 120 is not needed. The magnets 124 are arranged around the pole piece 120 in two concentric rows—a first row and a second row. The first row is adjacent the second end of the pole piece 120 and in a planar relationship with the opening of the bore 122 within the pole piece and a planar relationship with the upper edge 118 of the housing 112. The back portion of the magnets 124 of the first row are positioned such that they are adjacent the uppermost portion of the second end of the pole piece 120 and may be flush with, or disposed below, the uppermost portion of the second end of the pole piece 120. The first row of magnets 124 extend downward along the pole piece 120 with the front surface of the magnets 124 pointed towards the bottom portion 114 of the housing 112.

Figure 17:
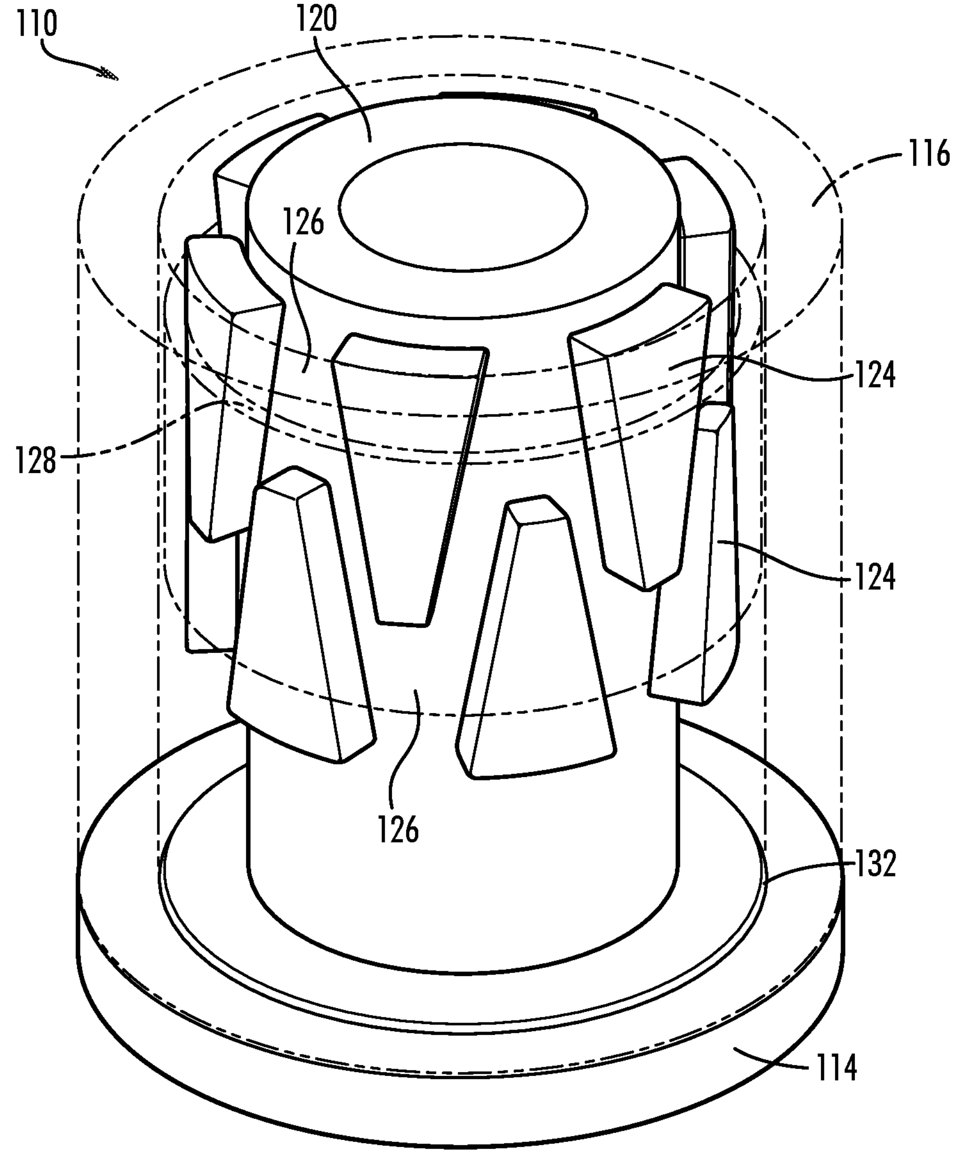
FIG. 17 is a perspective view of the alternative embodiment of FIG. 15 of the motor assembly of the present invention with an invisible view of the side portion.
Figure 18:
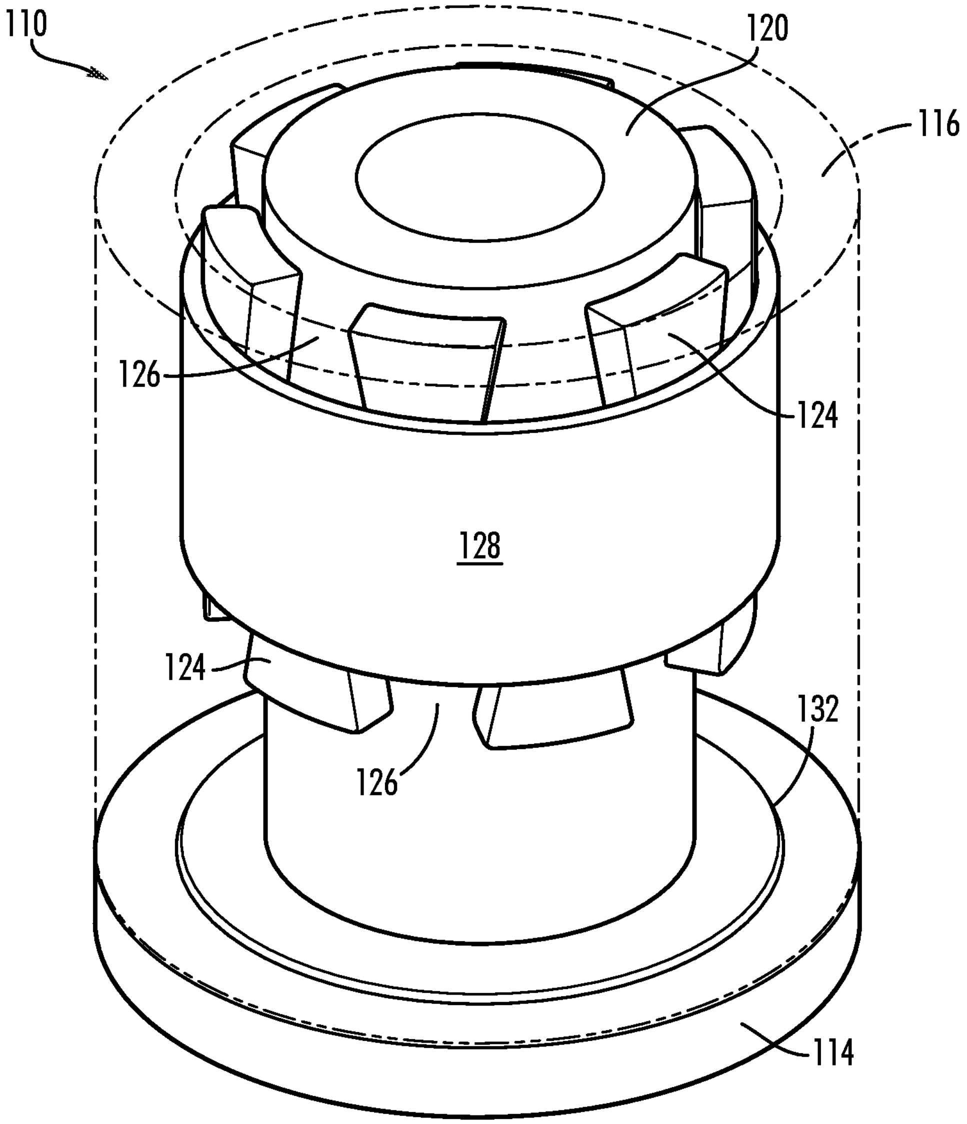
FIG. 18 is a perspective view of the alternative embodiment of FIG. 15 of the motor assembly of the present invention with an invisible view of the voice coil assembly and side portion.
Figure 19:
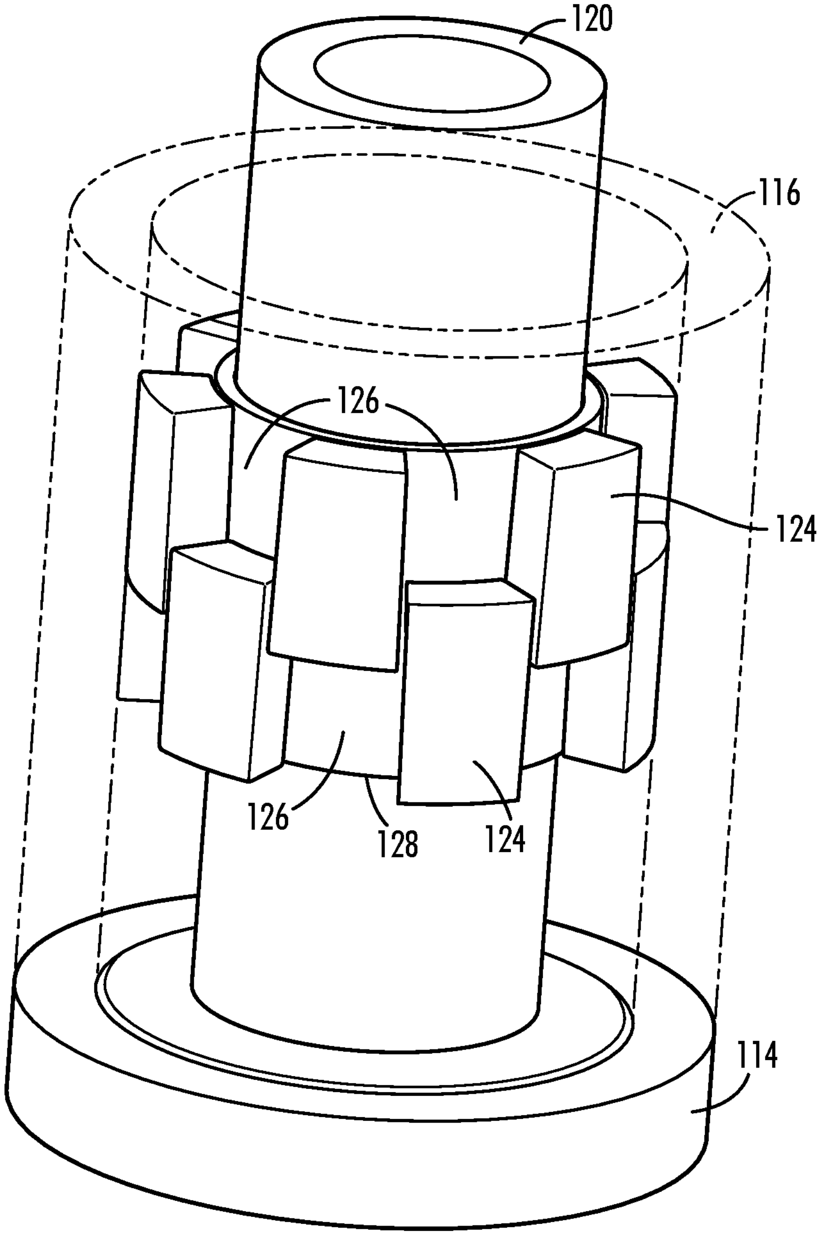
FIG. 19 is a perspective view of another alternative embodiment of the motor assembly of the present invention with an invisible view of the side portion.

The second row of magnets 124 may be positioned below the first row of magnets 124 or may be positioned such that the second row of magnets 124 is below the outermost portion of the first row of magnets 124, wherein the outermost portion of the first row is the portion closest to the upper edge 118 of the housing and the uppermost portion of the second end of the pole piece 120. As illustrated in FIGS. 15 and 17, the outermost portion of the first row is the back portion of the magnets 124 of the first row positioned at the uppermost portion of the second end of the pole piece 120. A portion of the magnets 124 within the second row are disposed on the exterior surface of the pole piece 120, such that a portion of the magnets 124 on the second row are disposed within the voids 126 between the magnets 124 of the first row. The magnets 124 of the second row are positioned such that the back surfaces are facing towards the bottom portion 114 of the housing 112 and the front surfaces are facing towards the uppermost portion of the second end of the pole piece 120, wherein the front surface and a portion of each of the side surfaces are positioned within the voids 126 of the first row and between the magnets 124 of the first row. Because the magnets 124 have a generally triangular shape, the voids 126 between the magnets 124 have a generally triangular shape that has an orientation reverse the orientation of the magnets 124, creating ample space for the reversely oriented magnets 124 of the second row to fit entirely or partially within the voids 126 of the first row. As shown in FIGS. 15 and 17, while the front surface and a portion of the two side surfaces may be positioned within the voids 126 of the first row of magnets 124, the back surface and a portion of the two side surfaces of the magnets 124 of the second row are not positioned within the voids 126 and between the magnets 124 of the first row, but positioned below the front surface of the magnets 124 of the first row.

Preferably, the magnets 124 of the present invention are a neodymium magnet ("neo magnet'), which is a permanent magnet made from an allow of neodymium, iron, and boron to form a $Nd_2Fe_{14}B$ tetragonal crystalline structure. The neo magnet may be plated or coated prior to use in the present invention. Commonly, the neo magnet may be nickel plated.

A voice coil assembly 128, and specifically the voice coil, is adjacent the exterior surface of the magnets 124. The void 126 between each magnet 124 extends from the external surface of the pole piece 120 to the voice coil assembly 128 that surrounds the exterior surface of the magnets 124. An air gap 130 is located between the exterior surface of the magnets 124 and the interior side of the side portion 116 of the housing 112.

The voice coil of the voice coil assembly 128 is positioned within the air gap 130. The voice coil assembly 128 preferably comprises a voice coil and bobbin, which may be of any size and shape depending upon the desires of the user. However, the voice coil assembly 128 may only consist of the voice coil in the present invention. The voice coil is preferably composed of copper, engaged to the exterior surface of each magnet 124, and surrounds all of the magnets 124 engaged to the pole piece 120.

The bottom portion 114 and the side portion 116 of the housing 112 are preferably composed of steel, but may be composed of another material as desired by the user.

Figure 26:
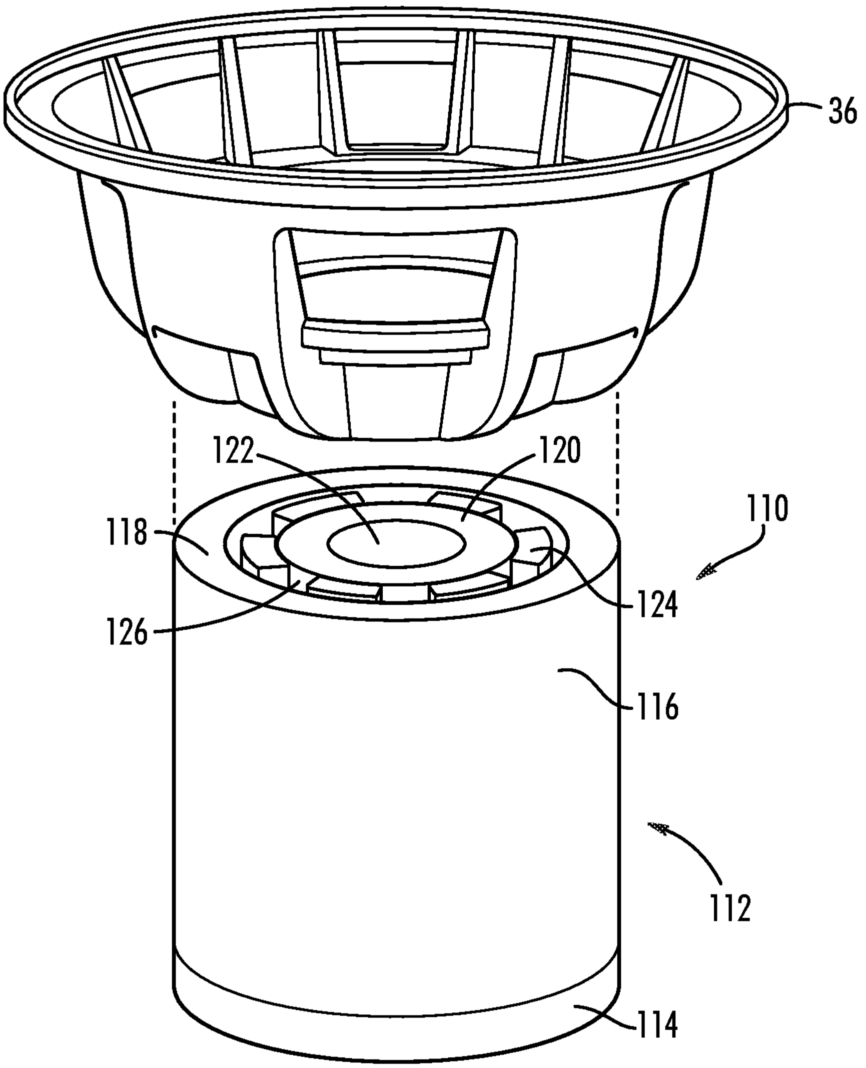
FIG. 26 is a perspective view of the alternative embodiment of FIG. 17 of the motor assembly engaged to a diaphragm assembly.

The motor assembly 110 is housed together with a diaphragm assembly 136 and collectively forming an audio speaker system, as illustrated in FIG. 26. The diaphragm assembly 136 preferably comprises a diaphragm, surround and spider. These components may have a number of different designs and configurations based upon the desires of the user. The diaphragm assembly 136 is engaged to the voice coil assembly 128 for transferring reciprocating motion during operation. In other words, the motor assembly 110 is configured to cause reciprocation axial movement of the diaphragm assembly 136 through the voice coil assembly 128. As a result, the diaphragm assembly 136 generates sound waves through the pressure exerted on ambient air.

As illustrated in FIG. 16, the interior surface of the magnets 124 preferably have a radius of curvature the same as or similar to that of the exterior surface of the pole piece 120. The interior surface of the magnets 124 may have the same as or similar radius of curvature as the external surface of the pole piece 120, allowing the interior surface of the magnet 124 to engage the pole piece 120 without any gaps or areas of separation between the interior surface of the magnet 124 and the exterior surface of the pole piece 120. The exterior surface of the magnets 124 may also a radius of curvature the same as or similar to that of the exterior surface of the pole piece 120.

As shown in FIGS. 15-18, a portion of the magnets 124 on the first row extend beyond the top portion of the voice coil assembly 128, and a portion of the magnets 124 on the second row extend beyond the bottom portion of the voice coil assembly 128. In other words, the back surface and a portion of both sides of the magnets 124 in the first row extend beyond the top portion of the voice coil assembly 128, and the back portion and a portion of both sides of the magnets 124 of the second row extend beyond the bottom portion of the voice coil assembly 128. In an alternative embodiment that contains all the above described features, the voice coil assembly 128 may completely cover and surround the external surface of each magnet 124 on the first row and the second row.

The bottom portion 114 may be engaged to the side portion 116 by an attachment device, such as a bolt or screw. Preferably, the attachment device is countersunk in the bottom portion 114. A plurality of holes may be dispersed along the upper edge 118 for engaging the diaphragm assembly. The interior surface of the bottom portion 114 contains a lip 132 for positioning the side portion 116 on the bottom portion 114 and securing the bottom portion 114 in place. The lip 132 on the bottom portion is circular and preferably disposed on the interior side of the bottom portion at a distance slightly greater than the width of the pole piece 120. The width of the pole piece 120 is the distance from its exterior surface to its interior surface, allowing the exterior surface of the pole piece 120 to be flush with the outer edge of the bottom portion 114. The bottom portion 114 contains two concentric sections on its interior side that have different heights, which is the distance between the exterior side to the interior side of the bottom portion 114, the lip 132 forms the transition between the two concentric sections. The first concentric section is adjacent the pole piece 120 and has a height greater than the height of the second concentric section that is adjacent the outer edge of the bottom portion 114. The bottom edge of the first end of the pole piece 120 is disposed on the second concentric section of the interior side of the bottom portion 114 with the lip 132 adjacent a portion of the interior side of the side portion 116.

An optional shroud with an internal surface and an external surface may be disposed around the exterior surface of the magnets 124. The shroud circles the pole piece 120 and may be engaged to the exterior surface of at least one magnet 124, two or more magnets 124, a plurality of magnets 124, or all of the magnets 124 engaged to the pole piece 120. The shroud may be a thin metal sheet, composed of aluminum, copper, steel, or the like, encircling the pole piece 120 and engaged to the exterior surface of the magnets 124. When the optional shroud is utilized, the voice coil assembly 128 surrounds the exterior surface of the shroud.

Another alternative embodiment is illustrated in FIGS. 19-22. The structure of the motor assembly 110 is the same as the structure of the motor assembly 110 described and illustrated in FIGS. 15-18 and 23-26 and is incorporated herein, except for the shape of the magnets 124. The shape of the magnets 124 in the embodiment illustrated in FIGS. 19-22 are rectangularly shaped and arranged in a first row and second row around the pole piece 120.

Figure 27:
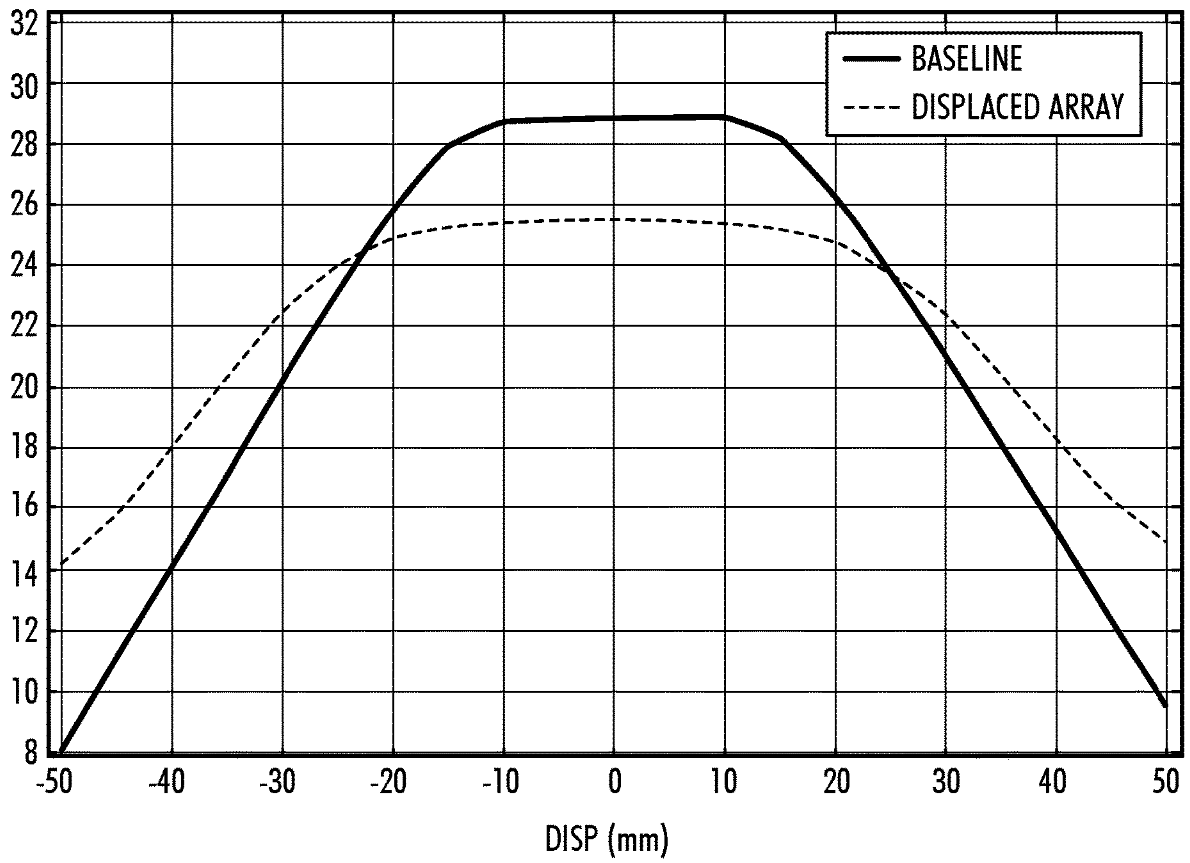
FIG. 27 is a graph comparing the motor force versus displacement at the voice coil for the embodiments.

A B1(x) plot is shown in FIG. 27 illustrating the product of the B-field and the length (L) of the voice coil. The displacement is shown on the x-axis and motor force is shown on the y-axis, the motor force versus the displacement at the voice coil is shown for the embodiments illustrated in FIGS. 1-8 and 10-26. FIG. 27 shows how much force the motor assembly 10 generates per unit of current (Ampere) throughout the displacement range or position of the voice coil. The present invention, as shown in FIG. 27, displaces the gap to cover a larger area of the voice coil, widening the linear range of the B1(x).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An audio speaker system assembly, comprising:

a housing with a bottom portion and a side portion;

a pole piece with an exterior surface;

a plurality of magnets spaced-apart from each other with an interior surface and an exterior surface, the interior surface of each magnet is engaged to the exterior surface of the pole piece;

an air gap between the pole piece and an exterior surface of the side portion; and a voice coil assembly disposed within the air gap and engaged to the exterior surface of each magnet and surrounding the magnets engaged to the pole piece.

2. The audio speaker system assembly according to claim 1, wherein each of the plurality of magnets are spaced an equal distance apart from each other around the exterior surface of the pole piece.

3. The audio speaker system assembly according to claim 1, wherein the magnets are not engaged to a structure for supporting the magnets.

4. The audio speaker system assembly according to claim 1, wherein the pole piece is generally circular and the radius of curvature of the interior surface of the magnets is identical to the radius of curvature of the pole piece.

5. The audio speaker system assembly according to claim 1, wherein the pole piece contains a centrally located, hollow bore, wherein a first portion of the bore contains a constant diameter and a second portion of the bore gradually increases in diameter to an end of the bore.

6. The audio speaker system assembly according to claim 1, wherein the at least one magnet is a neo-magnet and has a generally triangular shape.

7. An audio speaker system assembly, comprising:

a diaphragm assembly;

a housing with a bottom portion and a side portion;

a pole piece with an exterior surface;

a plurality of magnets spaced-apart from each other with an interior surface and an exterior surface, the interior surface of each magnet is engaged to the exterior surface of the pole piece;

an air gap between the pole piece and an exterior surface of the side portion; and a voice coil assembly disposed within the air gap.

8. The audio speaker system assembly according to claim 7, wherein the magnets are arranged in at least two rows along the exterior surface of the pole piece.

9. The audio speaker system assembly according to claim 7, wherein the voice coil assembly is engaged to the exterior surface of the magnets.

10. The audio speaker system assembly according to claim 7, wherein the wherein the magnets are not engaged to a structure for supporting the magnets.

* * * * *